(12) United States Patent
Karl et al.

(10) Patent No.: US 12,085,476 B2
(45) Date of Patent: Sep. 10, 2024

(54) METHOD FOR MONITORING AT LEAST ONE BEARING OF A MOTOR VEHICLE, IN PARTICULAR OF A MOTORIZED VEHICLE, AND MOTOR VEHICLE

(71) Applicant: AUDI AG, Ingolstadt (DE)

(72) Inventors: Bernhard Karl, Gaimersheim (DE); Felix Winkelmeyr, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 552 days.

(21) Appl. No.: 17/290,854

(22) PCT Filed: Dec. 19, 2019

(86) PCT No.: PCT/EP2019/086388
§ 371 (c)(1),
(2) Date: May 3, 2021

(87) PCT Pub. No.: WO2020/156745
PCT Pub. Date: Aug. 6, 2020

(65) Prior Publication Data
US 2021/0389213 A1    Dec. 16, 2021

(30) Foreign Application Priority Data

Jan. 31, 2019    (DE) .................... 10 2019 201 216.7

(51) Int. Cl.
*G01M 13/04*    (2019.01)
*B60W 50/14*    (2020.01)
*G01M 17/007*    (2006.01)

(52) U.S. Cl.
CPC ............ *G01M 13/04* (2013.01); *B60W 50/14* (2013.01); *G01M 17/007* (2013.01);
(Continued)

(58) Field of Classification Search
CPC .... G01M 13/04; G01M 17/007; B60W 50/14; B60W 2050/143; B60W 2520/105; B60W 2520/30
See application file for complete search history.

(56) References Cited

U.S. PATENT DOCUMENTS 9,074,970 B2 *   7/2015   Lund ..................... G01M 13/04
2013/0013138 A1  1/2013   Lu et al.

FOREIGN PATENT DOCUMENTS

DE    10 2015 213 084 A1    1/2017
DE    10 2018 113 389 A1   12/2018
(Continued)

OTHER PUBLICATIONS

English Machine Translation of Kim et al., KR 2015-0026416, translated online Nov. 2023 (Year: 2015).*
(Continued)

*Primary Examiner* — David Z Huang
(74) *Attorney, Agent, or Firm* — Maier & Maier, PLLC

(57) ABSTRACT

A method for monitoring at least one bearing of a motor vehicle which has the bearing and at least one electric machine, and can be operated by the electric machine supplying the electric machine with alternating electric current which is made available by power electronics, assigned to the electric machine, of the motor vehicle, as a result of which the electric machine is operated as an electric machine, by which the motor vehicle is operated, detecting the alternating current, made available by the power electronics, by at least one alternating current sensor; determining at least one torque which is made available by the electric machine in order to drive the motor vehicle, in accordance with the detected alternating current; and monitoring the bearing in accordance with the determined torque.

20 Claims, 2 Drawing Sheets

(52) U.S. Cl.
CPC . *B60W 2050/143* (2013.01); *B60W 2520/105* (2013.01); *B60W 2520/30* (2013.01)

(56) References Cited

FOREIGN PATENT DOCUMENTS

| EP | 1902293 A1 | | 3/2008 | |
|----|------------|---|--------|---|
| EP | 1 902 293 B1 | | 5/2010 | |
| EP | 2 989 436 B1 | | 6/2017 | |
| GB | 2532760 A | * | 6/2016 | ......... B60B 27/0068 |
| JP | 2013087786 A | * | 5/2013 | ............ F16C 33/723 |
| KR | 20150026416 A | * | 3/2015 | ............ G01M 13/04 |

OTHER PUBLICATIONS

English Machine Translation of Kamiya, JP 2013-87786, translated online Nov. 2023 (Year: 2013).*

Office Action issued on Feb. 28, 2023, in corresponding Chinese Application No. 201980083177.3, 28 pages.

Lu, "4WD Electric Car Permanent Magnet Brushless Wheels Motor Drive System Control Research", Dongfang Technology Co., Ltd., 2014, No. 7, pp. 1-3.

Kong, "Study on Stator Loss and Temperature Rise of High-Speed Permanent Magnet Motor", 2012, No. 7, pp. 1-3.

Examination Report issued on Oct. 25, 2019 in corresponding German application No. 10 2019 201 216.7; 10 pages including Machine-generated English-language translation.

International Search Report issued on Apr. 3, 2020 in corresponding International application No. PCT/EP2019/086388; 4 pages.

Written Opinion of the International Searching Authority issued on Apr. 3, 2020 in corresponding International application No. PCT/EP2019/086388; 16 pages.

Simsir, et al., "Real-Time Monitoring and Fault Diagnosis of a Low Power Hub Motor Using Feedforward Neural Network", Computational Intelligence and Neuroscience, 2015, pp. 1-13; 13 pages.

International Preliminary Report on Patentability issued on Jul. 27, 2021 in corresponding International application No. PCT/EP2019/086388; 15 pages.

Office Action issued on Jun. 26, 2023, in corresponding Chinese Application No. 201980083177.3, 22 pages.

European Examination Report issued on Nov. 4, 2022, in connection with corresponding European Application No. 19 832 924.5 (15 pp., including English-language translation).

Office Action issued on Dec. 27, 2023, in corresponding Chinese Application No. 201980083177.3, 6 pages.

* cited by examiner

METHOD FOR MONITORING AT LEAST ONE BEARING OF A MOTOR VEHICLE, IN PARTICULAR OF A MOTORIZED VEHICLE, AND MOTOR VEHICLE

FIELD

The disclosure relates to a method for monitoring at least one bearing of a motor vehicle, in particular of a passenger car. Moreover, the disclosure relates to a motor vehicle, in particular, a passenger car.

BACKGROUND

EP 2 989 436 B1 discloses a method for monitoring the soundness of a vehicle system. The procedure involves measuring a plurality of vehicle parameters under different operating conditions, including an end-off-line test. The parameter values are stored in a fingerprint file. In addition, the same plurality of parameter values contained in the fingerprint file are measured under similar load conditions after a preset time interval.

DE 10 2015 213 084 A1 discloses a method for monitoring a prior-art bearing system. What's more, an interface module device for connection to an electric machine is known from EP 1 902 293 B1.

SUMMARY

The object of the present invention is to achieve a method and a motor vehicle, such that at least one vehicle bearing may be monitored with particular precision.

A first aspect of the invention relates to a method for monitoring at least one bearing of a power-driven vehicle, preferably designed as a motor vehicle, in particular, a passenger car. The motor vehicle comprises the at least one bearing, and at least one electric machine, by means of which the motor vehicle may be driven, in particular, electrically. The motor vehicle is thus preferably designed as a hybrid or electric vehicle, in particular as a battery electric vehicle, such that the motor vehicle may be driven by means of the electric machine. The method provides that electric machine be supplied with electric alternating current, which is made available by power electronics of the motor vehicle associated with the electric machine. By supplying the electric machine with said alternating current, the electric machine is operated in motor mode, i.e., as an electric motor by means of which the motor vehicle is driven.

Furthermore, the alternating current provided by the power electronics is detected by means of at least one alternating current sensor of the motor vehicle, in particular the power electronics. Furthermore, at least one torque is determined, in particular computed, as a function of the detected alternating current or based on the detected alternating current, which torque is made available by the electric motor in order to start up the motor vehicle. In addition, the bearing is monitored or checked as a function of the determined, in particular, computed torque. The method is preferably implemented by means of an electronic vehicle computing device, such that, e.g., said torque is determined, in particular computed, by means of the electronic computing device.

The method according to the invention allows for monitoring the bearing, which is preferably designed as a roller bearing, in particular a ball bearing, or an antifriction bearing, particularly extensively over time, in particular, in at least a substantially continuous or permanent fashion. The bearing may, in particular, be monitored, i.e., checked particularly extensively during vehicle operation, in particular during normal vehicle operation, i.e., whenever the motor vehicle is driven, e.g., by the electric machine and/or motor. Hence, any changes, in particular a surge or increase in torque may be determined or detected at a particularly early stage. Such a change, in particular due to a surge or increase in torque, makes it possible to draw inferences about increasing bearing wear or imminent bearing damage. This makes it possible, e.g., to implement at least one action before excessive damage or failure of the bearing has time to occurs. Said action may include or result in repairing, replacing or servicing the bearing, before excessive wear, particularly damage or failure of the bearing occurs.

However, the method according to the invention also allows for determining the torque with utmost precision, in that the method according to the invention detects the alternating current via the alternating current sensor. Thus, the method according to the invention does not detect or detects not only an electric direct current, which is converted, e.g., into an electric current, but by detecting the alternating current it becomes possible to determine the torque with particular precision. In other words, the method according to the invention provides for determining the torque not on the basis of the direct current, or not only on the basis thereof, in that the torque is determined by taking into account the detected alternating current. The alternating current may be detected with particular precision, such that the torque can be determined in a particularly precise fashion Thus, the bearing may be monitored and checked particularly precisely and advantageously, when the bearing is a component of the electric machine and located, e.g., in the electric machine, in particular in a housing of the electric machine. In particular, the invention is based on the following realizations: In motor vehicles designed as, e.g., electric or hybrid vehicles, several bearings are usually used, in particular, bearings designed as roller bearings, e.g., as ball bearings. Such bearings are particularly used in the respective electric machines of the respective motor vehicles. It was found experimentally that the majority of damage occurring in the electric machines of motor vehicles is the result of bearing damage. In this case, the bearings are usually not monitored in so-called field use, where damage or failure of such a bearing usually leads to complete failure of the motor vehicle or its drive train. Diagnostic procedures, which allow for early detection of excessive wear, in particular of a bearing are generally non-existent. These problems and drawbacks are now avoidable thanks to the method according to the invention, such that, for example, the bearing can be serviced, repaired or replaced before a complete failure or breakdown of the bearing occurs. This means that while the bearing is still in working order the motor vehicle can be driven to an auto shop in order for the bearing to be, e.g., repaired, replaced or serviced there. Thus, expensive towing and transporting of the motor vehicle following bearing damage can be avoided.

Another realization upon which the invention is based is that with increasing wear or deterioration in the condition of the bearing, its frictional resistance increases. This leads to an increase in torque. The torque thus comprises, e.g., frictional resistance of the bearing, or bearing-friction torque resulting from frictional resistance. simply referred to as bearing torque. If, for example, such a trend is detected, when monitoring the bearing by means of the method over a predefinable or predefined period, i.e., at least, for example, substantially continuously, whereby the torque increases in particular under comparable or the same conditions, wherein the motor vehicle is driven in the described manner, it can be inferred that the friction torque of the bearing and thus its wear increases. Since the alternating current is now detected, and detection can be done in a particularly precise way, the torque and consequently, e.g., the bearing wear or the bearing-friction torque, can be determined with particular precision. In particular, excessive wear of the bearing can be detected at an early stage. In other words, if, for example, the determined torque exceeds a limit value, in particular a predefinable or predefined limit value, it can be inferred that the bearing is still functional, even though the wear of the bearing exceeds a preferred limit. Subsequently, e.g., the aforementioned action may be taken or performed in order to replace and service the bearing or to bring about replacement or service of said bearing. In general, it is obvious that the method according to the invention represents a diagnostic method with which excessive bearing wear can be detected at a particularly early stage. This means that the risk of damage to the bearing, while installing the bearing in the motor vehicle, and subsequent damage to the electric machine may be kept particularly low.

It was shown to be particularly advantageous if, as a function of the determined torque, at least one warning signal, in particular one that that can be detected visually, acoustically and/or haptically by an individual, is output by means of a vehicle-output device. For example, the warning signal may be output when the torque exceeds the limit value. The warning signal may be used to alert an individual, who may be the driver of the motor vehicle, if the bearing has excessive wear. In other words, e.g., by outputting the warning signal, an individual can be advised or prompted to take the motor vehicle to an auto shop in order to have the bearing serviced or replaced. This allows the person to have the bearing serviced or replaced before bearing failure and damage to the electric machine occurs.

It was shown to be particularly advantageous, if the warning signal is output to the passenger compartment of the motor vehicle. This means that a passenger or the driver of the motor vehicle will be informed at a particularly early stage that the bearing is in need of repair or replacement. These embodiments are based on the realization that servicing or replacing the bearing may be carried out in a particularly easy, quick and inexpensive way, if the bearing itself is still functional and has not yet failed, and no damage to the electric machine has occurred. In particular, the motor vehicle may be taken to the auto shop and need not be transported in a time-consuming and costly way, or with the aid of auxiliary means.

To be able to determine the torque in a particularly precise fashion, and thus monitor the bearing in a particularly advantageous way, a further embodiment of the invention provides that the method is performed out during a startup process, in which the initially stationary motor vehicle is cranked and set in motion. Thus, the start-up torque required for cranking the motor vehicle is determined as the torque. In other words, the electric machine is supplied with the alternating electric current during said startup process, whereby the motor vehicle is driven by means of the electric motor and thus cranked. Thus, it is further provided that the provided alternating current is detected during the startup process. This embodiment is based on the realization that the torque can be determined particularly advantageously during a specific startup process of the motor vehicle. In other words, the torque can be determined particularly advantageously during the specific successive startup processes. Again, stated differently, the specific torque values can be determined, e.g., during the specific, successive startup processes, such that the values can be compared with one another in a particularly advantageous fashion. This means that the aforementioned process may be identified particularly advantageously by comparing the values. In other words, comparing these value makes it particularly easy to determine, whether an increase in torque is due to an increase, e.g., in bearing wear. This is feasible in that during one or several startup process, conditions that can be compared particularly well with one another are always present. If, for example, it is detected based on the values or by comparing the values that the torque or the values increase, it can be inferred with a particularly high degree of certainty that the increase in the values or the torque is in fact due to increasing bearing wear and not other factors. This allows for the bearing to be monitored in a particularly precise fashion.

A further embodiment is characterized in that for cranking, in particular starting up the motor vehicle, at least one shaft of the motor vehicle is driven by means of the electric motor and thus rotated about an axis of rotation, such that the shaft is given a rotational speed which, in particular, is greater than zero. The rotational speed of the shaft is thus detected by means of at least one vehicle speed sensor provided in addition to the alternating current sensor, such that the bearing is also monitored as a function of the detected rotational speed. Taking into account the rotational speed when determining the torque or monitoring the bearing allows for creating comparable conditions or ensuring that any torque increase is in fact due to increased bearing wear, and not other factors.

It was shown to be particularly advantageous if the start-up torque is also determined as a function of the detected rotational speed.

This means, e.g., that static bearing friction can be ignored, thereby avoiding any misdiagnosis.

In a particularly advantageous embodiment of the invention, at least one geographical location of the motor vehicle is determined, in particular during cranking or startup, wherein the bearing is monitored as a function of the determined position. The position is determined, e.g., by means of a vehicle-navigation device and/or satellite-supported. It is especially conceivable that the torque, in particular the start-up torque, is determined, in particular, computed, as a function of the geographical location. Thus, local or ambient effects that may give rise to a change or impairment of the torque may be taken into account and, e.g., discounted when calculating the torque, such that it can be determined whether any torque increase is in fact due to increased bearing wear and not local factors or ambient conditions.

A further embodiment of the invention provides for determining at least one inclination of the motor vehicle about its transverse vehicle direction, in particular when cranking or starting. Alternatively or additionally, at least one acceleration acting on the motor vehicle, in particular in the transverse and/or longitudinal vehicle direction, in particular when cranking or starting, is determined or detected by means of at least one vehicle-acceleration sensor. The inclination of the motor vehicle is determined, e.g., by means of the acceleration sensor in order to detect any acceleration acting on the motor vehicle, whereby the inclination is determined as a function of the detected acceleration.

The bearing is monitored as a function of the determined inclination and/or the determined acceleration. In particular, the torque, especially the start-up torque, is determined as a function of the inclination and/or the acceleration. This allows for comparing torque values, which are determined by cranking or starting the vehicle on a horizontal plane, such that torque values are determined by cranking or starting the motor vehicle ascending an incline and/or descending a slope, whereby the inclination or acceleration and thus external factors are taken into account, when determining the torque or its values. If, for example, the motor vehicle is initially parked on a slope and the motor vehicle is cranked, in particular started on a downhill slope, the result may be that the torque is smaller than if the motor vehicle is cranked, in particular started, on a horizontal plane. By taking into account the inclination of the motor vehicle, it now becomes possible to determine whether any difference between the torque or its values is only due to the inclination or the inclination, plus an increase in bearing wear. This allows for checking the bearing in almost any situation, in which the motor vehicle is cranked, in particular started, such that the bearing may be monitored, at least almost continuously. In particular, excessive bearing wear can thus be detected early on.

Finally, it was shown to be particularly advantageous if eddy-current losses and/or air-friction losses are determined when cranking, in particular starting up, whereby the bearing is monitored as a function of the determined eddy-current losses and/or air-friction losses. In particular, the torque, especially the start-up torque, is determined as a function of the determined eddy-current losses and/or air-friction losses. This embodiment is based on the realization that the electric machine or the electric drive of a motor vehicle has a drag torque, which usually is the result of iron-circuit losses or eddy-current losses, i.e., losses caused by eddy currents, air-friction losses, and bearing-friction losses. In other words, drag torque includes at least eddy-current losses, air-friction losses, including bearing-friction losses.

The bearing-friction losses are, e.g., a result of the aforementioned bearing-friction torque. For example, at least the drag torque must be overcome for the electric machine, in particular its rotor to be rotated, in particular, when not starting up the motor vehicle in order to crank the motor vehicle, in particular starting it, the drag torque and, if necessary, an additional drive torque must be overcome by supplying the electric machine with alternating current. The drive torque may be the aforesaid torque, in particular the aforesaid start-up torque, also referred to as the breakaway torque. The eddy-current and the air-friction losses increase with increasing speed of the electric machine, in particular of the rotor, although the bearing-friction losses or the bearing-friction torque remain constant over the speed, or at least substantially so. If the torque, in particular the start-up torque, is now increased, especially under identical or comparable conditions, it can be inferred that the bearing-friction torque and thus the wear of the bearing is increasing. This is explained by the fact that the torque, or the start-up torque, includes the drag torque, and thus the bearing-friction torque. Since, for example, the inclination and/or the acceleration and/or the rotational speed are detected and taken into account, when determining the torque, the torque can be determined in the different situations, in which the motor vehicle is operated, in particular started up, such that, e.g., the respective torque values can be determined for these different situations. By taking into account the inclination and/or acceleration and/or speed, the situations and thus the values can be compared with one another, or made comparable with one another, in that it can be determined, e.g., that any changes in the torque or its values are not a result of the different situations, i.e., different accelerations and/or speeds and/or inclinations, but rather changes in the bearing-friction torque. This means that the bearing can be monitored in a particularly extensive and precise fashion.

A second aspect of the invention relates to a power-driven vehicle, preferably designed as a motor vehicle, in particular a passenger car, which is designed to implement a method according to the invention. The invention also includes further embodiments of the motor vehicle according to the invention, which have the features already described in connection with the further embodiments of the method according to the invention. For this reason, we shall not describe again the corresponding further embodiments of the motor vehicle according to the invention. The motor vehicle according to the invention is preferably designed as a motor vehicle, in particular as a passenger car, a truck, a minibus, or a motorcycle. The invention also includes combinations of the features of the described embodiments.

BRIEF DESCRIPTION OF THE FIGURES

Below follows a description of an exemplary embodiment of the invention. In the drawings.

DETAILED DESCRIPTION

Figure 1:
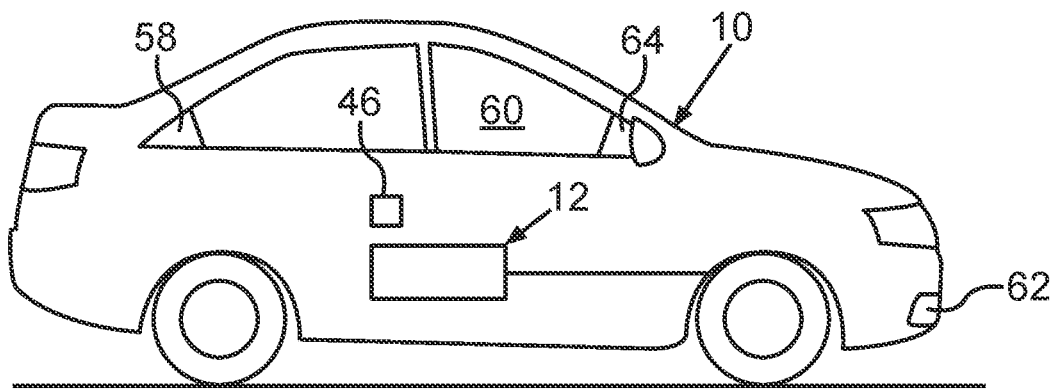
FIG. 1 is a schematic side view of a motor vehicle according to the invention.

The exemplary embodiment explained below relates to a preferred embodiment of the invention. In the exemplary embodiment, the described components of the embodiment each represent individual features of the invention, which are to be considered independently of one another, and which further develop the invention independently of one another. Thus, the invention is intended to include combinations of the features of the embodiments other than those already explained. What's more, the described embodiment may also be supplemented by the already described further features of the invention.

In the figures, identical reference numerals refer to elements with identical functions.

FIG. 1 shows a schematic side view of a motor vehicle 10 designed as a motor vehicle, in particular a passenger car. The power-driven motor vehicle 10 is designed as a hybrid or power-driven motor vehicle and comprises a drive train 12, which is particularly well identifiable in combination with FIG. 2, and which is also referred to as an electric drive train or electric drive. The motor vehicle 10 can be operated, in particular electrically, by means of the drive train 12. For this purpose, the drive train 12 and thus the motor vehicle 10 include an electric machine 14, by means of which the motor vehicle can be operated electrically. The electric machine 14 includes a stator 16 and a partially identifiable rotor 18, which may be operated by, e.g., the stator 16, and thus rotatable about a rotational axis 20 of the motor relative to the stator 16. As is particularly obvious, when viewed in conjunction with FIG. 3, the rotor 18 includes a shaft 22, also referred to as a rotor shaft, which is rotatable about the motor axis of rotation 20 relative to the stator 16, as illustrated by an arrow 24 in FIG. 2. Furthermore, a section of the housing 26 of the electric machine 14 is shown in FIG. 3, in which the stator 16 is fastened, e.g., to the housing 26. Thus, the rotor 18 and thus the shaft 22 are rotatable about the motor axis of rotation 20 relative to the housing 26. The motor vehicle 10 also comprises at least one bearing 28 shown in FIG. 3, which in the present case is a roller bearing, in particular in the form of a ball bearing. In the exemplary embodiment illustrated in the figures, the bearing 28 is part of the electric machine 14 and thus constitutes a bearing of the electric machine 14, wherein the bearing 28 is located in the housing 26. The shaft 22 is rotatably mounted on the housing 26 by means of the bearing 28, or via the bearing 28. In particular, the shaft 22 is supported or supportable along its radial direction by the bearing 28 on the housing 26.

The bearing 28 comprises, e.g., a first bearing ring in the form of an inner ring 30, which is non-rotatably connected, e.g., with the shaft 22. Furthermore, bearing 28 comprises a second bearing ring in the form of an outer ring 32, which is non-rotatably connected with, e.g., the housing 26. The bearing rings have the respective raceways 34 and 36. The bearing 28 further comprises rolling elements 38, which in the present case are designed as balls. If the shaft 22 is now rotated about the motor axis of rotation 20 relative to the housing 26, the result is a relative rotation between the bearing rings about the motor axis of rotation 20. This makes the rolling elements 38 roll on the raceways 34 and 36.

The drive train 12, and thus the motor vehicle 10, further comprise power electronics 40 associated with the electric machine 14, via which the electric machine 14 may be supplied with electrical energy or electric current. In particular, the power electronics 40 are designed to provide electric current in the form of alternating electric current. The electric machine 14 is thus being supplied with alternating current provided by the power electronics 40, whereby the electric machine 14 is operated in motor mode, i.e., as an electric motor. The electric motor provides drive torques via the rotor 18, and thereby via the shaft 22, also referred to as the rotor shaft, whereby the motor vehicle 10 may be operated electrically.

Figure 2:
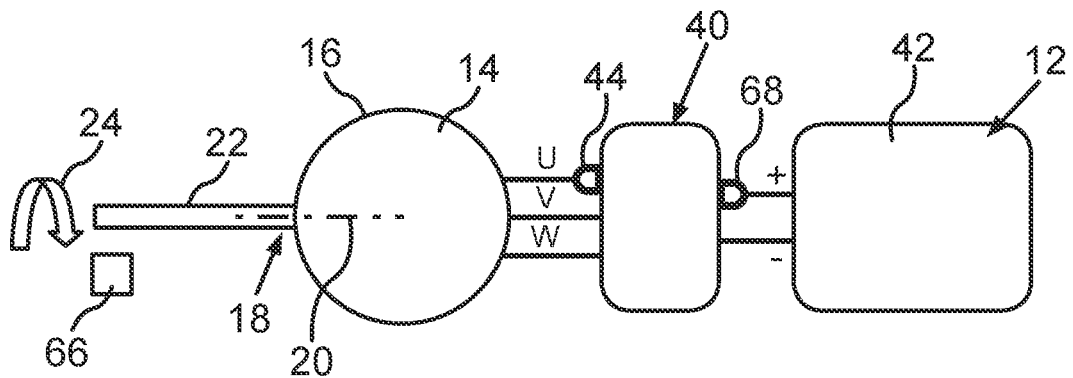
FIG. 2 is a schematic representation of a drive train of the motor vehicle, allowing for the vehicle to be electrically operated.
Figure 3:
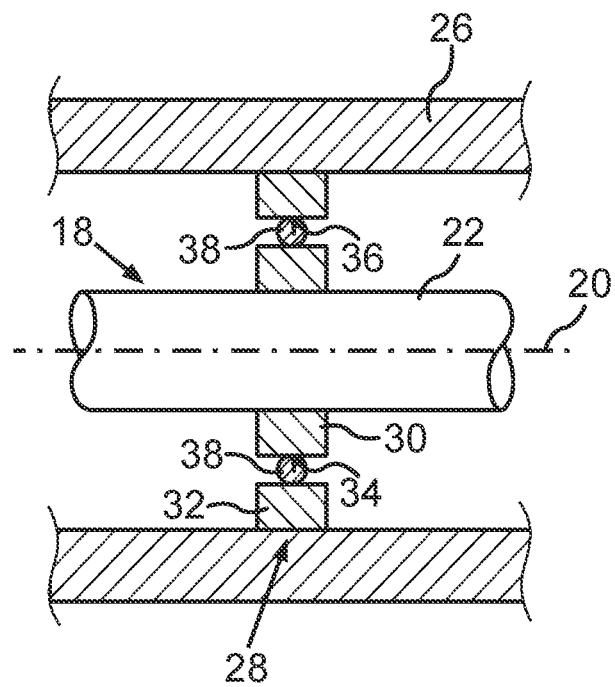
FIG. 3 is a schematic side view of a shaft of the drive train.

FIG. 2 shows that the electric machine 14 in the present case is embodied as a multiphase electric machine, and thus has several electrical phases. In the present embodiment, the electric machine 14 is a three-phase electric machine, such that it has three phases u, v, and w. Therefore, the alternating current is a three-phase alternating current with exactly three phases u, v, and w.

The drive train 12 and thus the motor vehicle 10 further comprise an energy storage 42 devised to store electrical energy or an electric current, and which is embodied, e.g., as a battery, in particular a high-voltage battery (HV battery). In particular, the electric machine 14 and the energy storage 42 are designed as high-voltage components, which have an electrical voltage, in particular an electrical operating voltage, which is greater than 50 volts. The electrical voltage is preferably several hundred volts in order to achieve particularly high electrical powers for electric operation of the motor vehicle 10. Here, an electrical positive pole of the energy storage 42 is denoted by + in FIG. 2, and an electrical negative pole of the energy storage 42 is denoted by −.

In order to operate the electric machine 14 in motor mode, the energy storage 42 provides electric direct current (DC), such that the power electronics 40 are supplied with direct current made available by the energy storage 42. In other words, the power electronics 40 receives direct current made available by the energy storage 42. The direct current made available by the energy storage 42 and received by the power electronics 40 is converted by the power electronics 40 to the aforementioned alternating current, which is made available by the power electronics 40, transmitted to the electric machine 14, and received by the electric machine 14. In this way, the electric machine 14 is supplied with the alternating current made available by the power electronics 40.

Described below is a method for monitoring at least the bearing 28, wherein the bearing 28 may be monitored particularly precisely by means of the method. In a first step of the method, the electric machine 14 is supplied with the electric alternating current supplied by the power electronics 40 associated with the electric machine 14. As a result, the electric machine 14 is operated as the aforementioned electric motor, by means of which the motor vehicle 10 is cranked, in particular started up.

In a second step of the method, the alternating current provided by the power electronics 40 is detected by means of at least one alternating current sensor 44 shown very schematically in FIG. 2. The alternating current sensor 44 is a component, e.g., of the power electronics 40 and is located, e.g., in the power electronics 40, in particular, in a housing of the power electronics 40. The alternating current, also referred to as AC or AC current, can be detected with particular precision by means of the alternating current sensor 44, also referred to as an AC sensor.

In a third step of the method, at least one torque is determined, in particular computed as a function of the detected alternating current, which torque is provided by the electric motor, in particular via the rotor 18, and thus via the shaft 22, for cranking, in particular, starting up the motor vehicle 10. For example, the torque is determined, in particular computed, by means of an electronic computing device 46 of the motor vehicle 10, in particular, of the drive train 12, shown very schematically in FIG. 1. For this purpose, the alternating current sensor 44 provides, e.g., at least one sensor signal, in particular an electric sensor signal, which is received by the electronic computing device 46. Depending on the received sensor signal, the electronic computing device 46 determines, in particular computes, the torque. In particular, the electronic computing device 46 determines, in particular computes, at least one value of the torque characterizing the torque and, furthermore, referred to as the torque value. In a fourth step of the method, the bearing 28 is monitored as a function of the determined torque, i.e., a function of the torque value. Said torque is, e.g., the torque required for start-up the initially stationary motor vehicle 10, and is also referred to as the start-up torque, or breakaway torque, which is or is to be provided by the electric machine 14 during cranking the motor vehicle in order to start the initially stationary motor vehicle and thus set it in motion. Since the alternating current can be or is detected particularly accurately by means of the alternating-current sensor 44, the torque can be determined in a particularly precise fashion. The determined torque depends on losses, in particular frictional losses, of the bearing 28, whereby these frictional losses of the bearing 28 depend on a bearing friction torque, also referred to as bearing 28 friction torque or are caused by the bearing friction torque. Thus, the torque comprises the bearing 28 friction torque. If, for example, the torque is now determined several times in succession, such that the respective values of the torque are determined, it can be determined on the basis of the torque values, in particular by comparing the torque values, whether these values differ from one another. In particular, this can be used to determine whether the torque values or the torque are increasing. Any increase in torque allows for the inference that the bearing 28 friction torque, and thus the wear, is increasing. In this way, excessive bearing 28 wear can be detected at a particularly early stage, such that servicing or replacement of the bearing 28 can be implemented or prompted before bearing 28 failure occurs and hence damage to the drive train 12.

Figure 4:
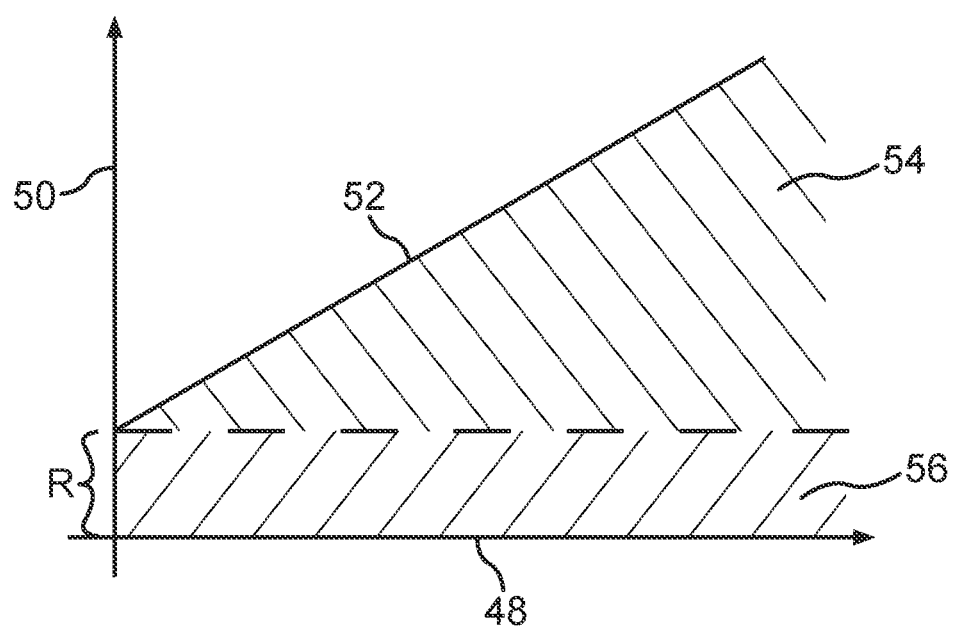
FIG. 4 is a diagram illustrating a method according to the invention for monitoring at least one motor-vehicle bearing.

FIG. 4 shows a diagram, on the abscissa 48 of which, the rotational speed of the electric machine 14, in particular of the rotor 18, is plotted. The drag torque of the electric machine 14 is plotted on the ordinate 50 of the diagram. The curve 52 entered in the diagram represents a curve of the drag torque versus the rotational speed. The drag torque is composed of eddy-current and air-friction losses, the contribution of which to the drag torque is illustrated, e.g., in FIG. 4 by a hatched area 54 below the curve 52. In addition, the drag torque is composed of the aforementioned friction losses, also known as bearing friction losses, the contribution of which to the drag torque is illustrated in FIG. 4 by a further hatched area 56 below the curve 52. FIG. 4 shows the increase in the eddy-current and air-friction losses, as the rotor 18 speed increases, however, the bearing-friction losses and hence the bearing-friction torque, denoted R in FIG. 4 and also referred to as the bearing torque, remain at least substantially constant over the speed. Air-friction losses, including eddy-current losses, also known as iron losses, are zero, when the speed is zero. Since the torque now includes the drag torque, and the drag torque includes the bearing torque, the bearing torque can now be monitored, in particular, by at least substantially continuous monitoring of the torque, whereby the bearing 28, and thus its wear can be monitored. It is advantageous to monitor or record the torque, in particular at least substantially continuously, in order, e.g., to compensate for or determine fluctuations due to the slope inclination and/or different subsoils. The aim is, e.g., to determine trends. If, for example, on the basis of the torque values, a trend is recognized, meaning that the torque values increase, and thus the torque increases, it can be inferred that the wear of bearing 28 is increasing. If, for example, the torque exceeds a predefinable limit value, it can be inferred that the wear of the bearing 28 exceeds or has already exceeded a predefined or predefinable limit. As a result, for example, the driver of the motor vehicle 10 may be prompted to have the bearing 28 serviced or replaced.

For this purpose, e.g., as a function of the determined torque, at least one information signal, which may be perceived visually and/or acoustically and/or haptically by the driver is output by means of a vehicle 10 output device 58, which is shown very schematically in FIG. 1, wherein the output device 58 is located in the passenger compartment 60 of motor vehicle 10. Thus, the warning signal is output to the passenger compartment 60.

It is particularly advantageous, if any inclinations of the motor vehicle 10 and its transverse direction are determined using at least one or more position sensors of the motor vehicle 10, e.g., in order to compensate for or exclude distortions due to inclines and/or slopes. Thus, it is, e.g., provided that at least one inclination of the motor vehicle 10 and its transverse direction, in particular when cranking or starting, and/or at least one acceleration acting on the motor vehicle 10, when cranking or starting, is detected by means of at least one sensor 62 of the motor vehicle 10, which is shown very schematically in FIG. 1, and is designed, e.g., as an acceleration sensor, wherein the bearing 28 is monitored as a function of the detected inclination or acceleration. In particular, the torque is determined as a function of the detected inclination or acceleration.

It may alternatively or additionally be provided that at least one geographical location of the motor vehicle 10 is determined by means of a vehicle 10 navigation device 64, shown very schematically in FIG. 1, in particular satellite-supported. In this case, the bearing 28 is monitored as a function of the determined position, e.g., whereby the torque is determined as a function of the determined position. Furthermore, it was shown to be particularly advantageous, if the rotational speed of shaft 22 as a result of cranking the shaft 22 is detected by means of a speed sensor 66 of vehicle 10, in particular of the drive train 12, which is provided in addition to the alternating current sensor 44, whereby the bearing 28 is monitored as a function of the detected rotational speed of the shaft 22. In particular, the torque is preferably determined as a function of the detected rotational speed of the shaft 22.

Preferably, the electric machine 14 is free of torque-measuring flanges and/or torque sensors, so as to be able to keep particularly low the number of parts, the installation space requirement, and the costs, as well as the weight. However, electric drives and thus the electric machine 14 have the physical property that torque and electric current are directly proportional to one another. In this regard, the power electronics 40 that supply alternating current to the electric machine 14 comprise at least one or more highly accurate current sensors. One of the current sensors, or the current sensor of the electric machine 14, is the alternating current sensor 44. If the detected alternating current, which is required during cranking or start-up, is now evaluated, in particular such that the torque is determined, in particular computed, based on the detected alternating current, inferences may be drawn concerning the bearing torque and, as a result, the wear of bearing 28 given the fact that the torque comprises the drag torque, and the drag torque comprises the bearing torque.

For example, to avoid misdiagnosis due to static friction, particularly in the bearing 28, the speed sensor 66 is resorted to. Speed sensor 66 can detect highly precisely the speed of the shaft 22, and thus of the rotor 18, and hence of the bearing 28. Thus, the speed detected by means of the speed sensor 66 can be used to detect when the static friction has been overcome. In other words, the torque is preferably determined after overcoming the static friction. For this purpose, the speed sensor 66 is designed. e.g., as a resolver, or as a comparable sensor in order to detect, e.g., even the smallest angular changes, which are greater than or equal to 0.01 degrees of the shaft 22. Thus, the speed can be detected with particular precision by means of speed sensor 66.

In the present case, motor vehicle 10, in particular drive train 12, also comprises a direct current sensor 68 by means of which the direct current provided by the energy storage 42 is detected or is detectable. In particular, the DC current sensor 68 can be used to determine the amount of direct current made available by the energy storage 42, and thus drawn from energy storage 42. The torque may be conceivably be determined as a function of the direct current detected by means of the direct current sensor 68, whereby the torque can be determined particularly precisely.

The invention claimed is:

1. A method for monitoring a bearing of a motor vehicle, comprising the bearing and an electric machine, wherein the motor vehicle can be operated by the electric machine, comprising:

supplying the electric machine with an alternating electric current, which is made available by power electronics of the motor vehicle associated with the electric machine, whereby the electric machine is operated as an electric motor by which the motor vehicle is operated;

detecting the alternating current provided by the power electronics by at least one alternating current sensor;

determining at least one torque made available by the electric motor for cranking the motor vehicle as a function of the detected alternating current;

monitoring the bearing as a function of the determined torque; and inferring that wear of the bearing has exceeded a predefined limit after the determined torque exceeds a predefined limit value.

2. The method according to claim 1, further comprising:
generating at least one warning signal by an output device of the motor vehicle as a function of the determined torque.

3. The method according to claim 2, wherein the warning signal is output to a passenger compartment of the motor vehicle.

4. The method according to claim 1, wherein the method is implemented during a startup process, in which the initially stationary motor vehicle is started by cranking the motor vehicle, which is thereby set in motion, and the start-up torque, which is required for starting up the motor vehicle and/or is provided by the electric machine, is determined as the torque.

5. The method according to claim 1, wherein in order to operate the motor vehicle, at least one shaft of the motor vehicle is cranked and thereby rotated about an axis of rotation, and a rotational speed of the shaft is detected by at least one speed sensor of the motor vehicle provided in addition to the alternating current sensor, and the bearing is also monitored as a function of the detected rotational speed.

6. The method according to claim 4, wherein the start-up torque is also determined as a function of a detected speed.

7. The method according to claim 1, wherein at least one geographical location of the motor vehicle is determined and the bearing is monitored as a function of the at least one geographical location.

8. The method according to claim 1, further comprising:
determining at least one inclination of the motor vehicle about its transverse direction and/or at least one acceleration acting on the motor vehicle by at least one acceleration sensor of the motor vehicle; and
monitoring the bearing as a function of the determined inclination and/or as a function of the determined acceleration.

9. The method according to claim 1, wherein eddy-current losses and/or air-friction losses occurring, when cranking, are determined and the bearing is monitored as a function of the determined eddy-current losses and/or air-friction losses.

10. A motor vehicle which is configured to implement the method according to claim 1.

11. The method according to claim 2, wherein the method is implemented during a startup process, in which the initially stationary motor vehicle is started by cranking the motor vehicle, which is thereby set in motion and the start-up torque, which is required for starting up the motor vehicle and/or is provided by the electric machine, is determined as the torque.

12. The method according to claim 3, wherein the method is implemented during a startup process, in which the initially stationary motor vehicle is started by cranking the motor vehicle, which is thereby set in motion and the start-up torque, which is required for starting up the motor vehicle and/or is provided by the electric machine, is determined as the torque.

13. The method according to claim 2, wherein in order to operate the motor vehicle, at least one shaft of the motor vehicle is cranked and thereby rotated about an axis of rotation, a rotational speed of the shaft is detected by at least one speed sensor of the motor vehicle provided in addition to the alternating current sensor, and the bearing is also monitored as a function of the detected rotational speed.

14. The method according to claim 3, wherein in order to operate the motor vehicle, at least one shaft of the motor vehicle is cranked and thereby rotated about an axis of rotation, a rotational speed of the shaft is detected by at least one speed sensor of the motor vehicle provided in addition to the alternating current sensor, and the bearing is also monitored as a function of the detected rotational speed.

15. The method according to claim 4, wherein in order to operate the motor vehicle, at least one shaft of the motor vehicle is cranked and thereby rotated about an axis of rotation, a rotational speed of the shaft is detected by at least one speed sensor of the motor vehicle provided in addition to the alternating current sensor, and the bearing is also monitored as a function of the detected rotational speed.

16. The method according to claim 1, further comprising:
determining a start-up torque as a function of a detected speed.

17. The method according to claim 2, wherein at least one geographical location of the motor vehicle is determined and the bearing is monitored as a function of the at least one geographical location.

18. The method according to claim 3, wherein at least one geographical location of the motor vehicle is determined and the bearing is monitored as a function of the at least one geographical location.

19. The method according to claim 4, wherein at least one geographical location of the motor vehicle is determined and the bearing is monitored as a function of the at least one geographical location.

20. The method according to claim 5, wherein at least one geographical location of the motor vehicle is determined and the bearing is monitored as a function of the at least one geographical location.

* * * * *